Figure 1C:
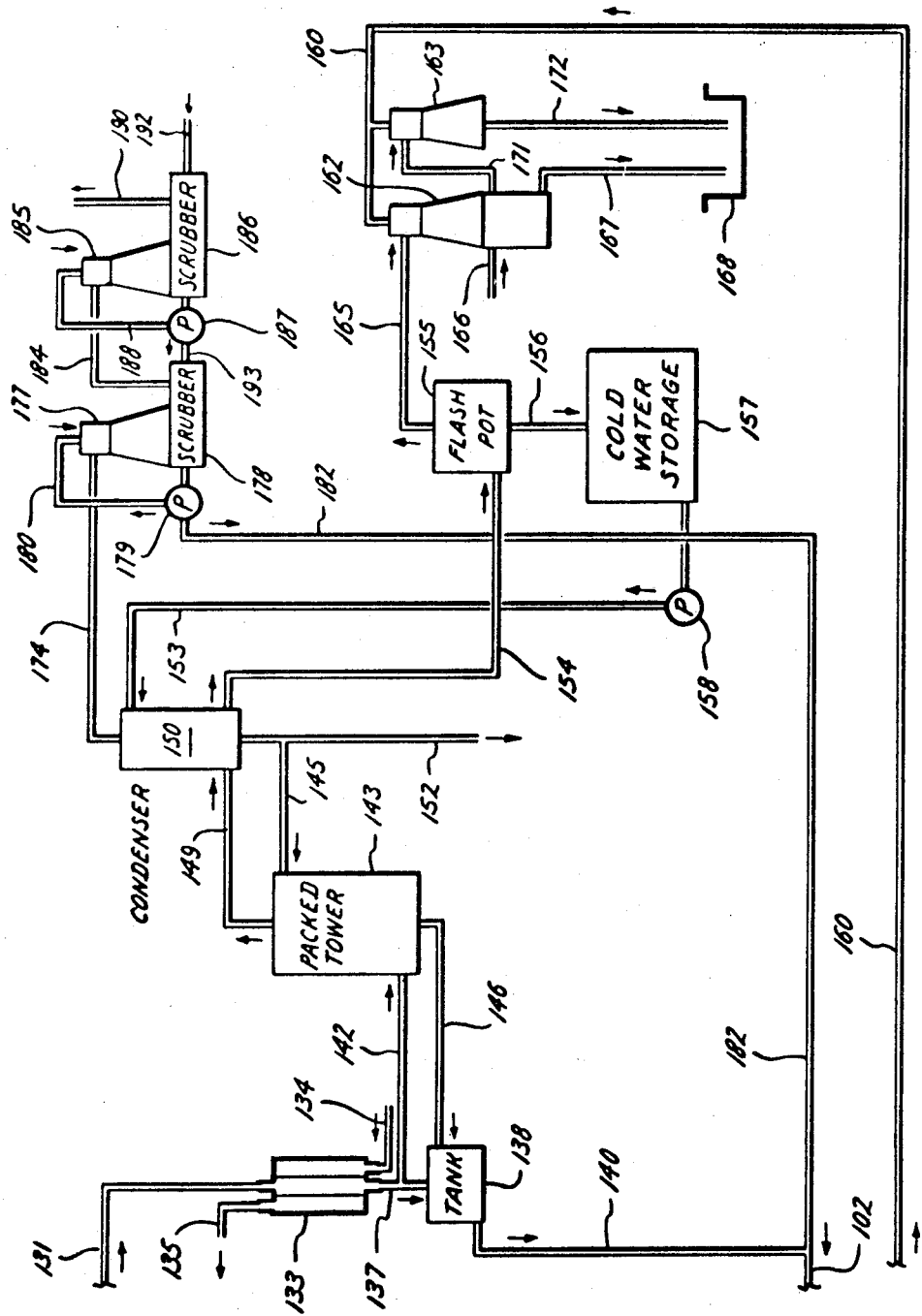

United States Patent [19]

Hartig

[11] 3,711,596

[45] *Jan. 16, 1973

[54] RECOVERY OF HYDROGEN FLUORIDE

[76] Inventor: Rufus G. Hartig, c/o Gulf Design and Engineering Corp., 124 South Ingraham Avenue, Lakeland, Fla. 33801

[*] Notice: The portion of the term of this patent subsequent to July 16, 1986, has been disclaimed.

[22] Filed: March 4, 1965

[21] Appl. No.: 437,110

[52] U.S. Cl. ............... 423/483, 423/336, 423/337, 423/462, 423/472, 423/489
[51] Int. Cl. .................................................. C01b 7/22
[58] Field of Search ......... 23/153, 88, 1 F, 1 FT, 205, 23/182 V

[56] References Cited

UNITED STATES PATENTS

| | | | |
|---|---|---|---|
| 2,588,786 | 3/1952 | Winter | 23/153 |
| 2,966,354 | 8/1961 | La Croix | 23/88 |
| 3,087,787 | 4/1963 | Flemmert | 23/153 |
| 3,140,152 | 7/1964 | Rucker | 23/88 X |
| 3,157,469 | 11/1964 | Tufts | 23/88 X |
| 3,164,440 | 1/1965 | Levey Jr. | 23/1 |
| 3,207,579 | 9/1964 | Burkhardt | 23/153 |
| 3,219,410 | 11/1965 | Dexter | 23/88 X |

*Primary Examiner*—Edward Stern
*Attorney*—Carl B. Fox, Jr.

[57] ABSTRACT

The disclosure 113 of methods for recovering hydrogen fluoride from aqueous feed liquids containing fluosilicic acid in solution. The fluosilicic acid is converted to 07161986 hydrogen fluoride, which is reclaimed by absorption and desorption, using sodium fluoride-sodium bifluoride in fluidized beds.

2 Claims, 3 Drawing Figures

United States Patent [19]
Hartig
[11] 3,711,596
[45] *Jan. 16, 1973
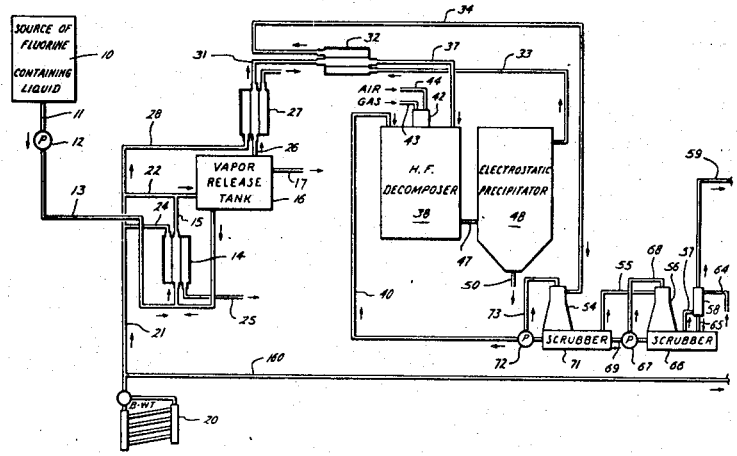
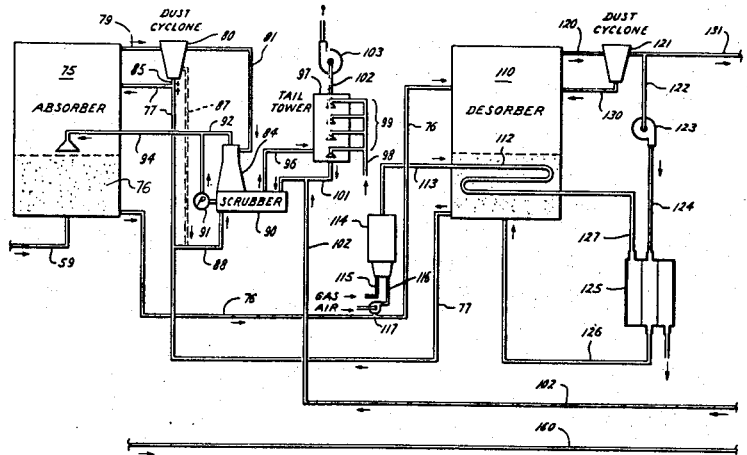
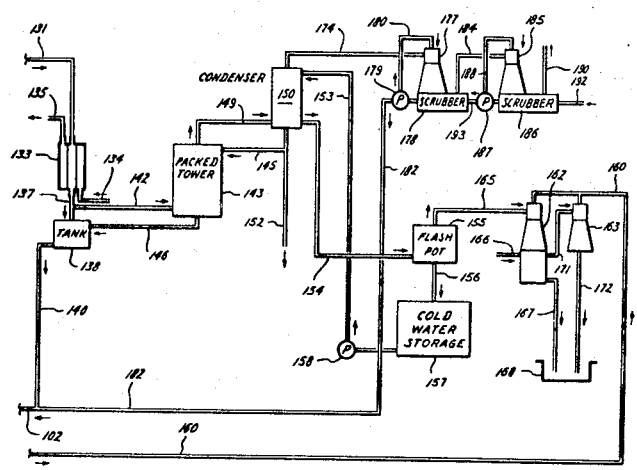

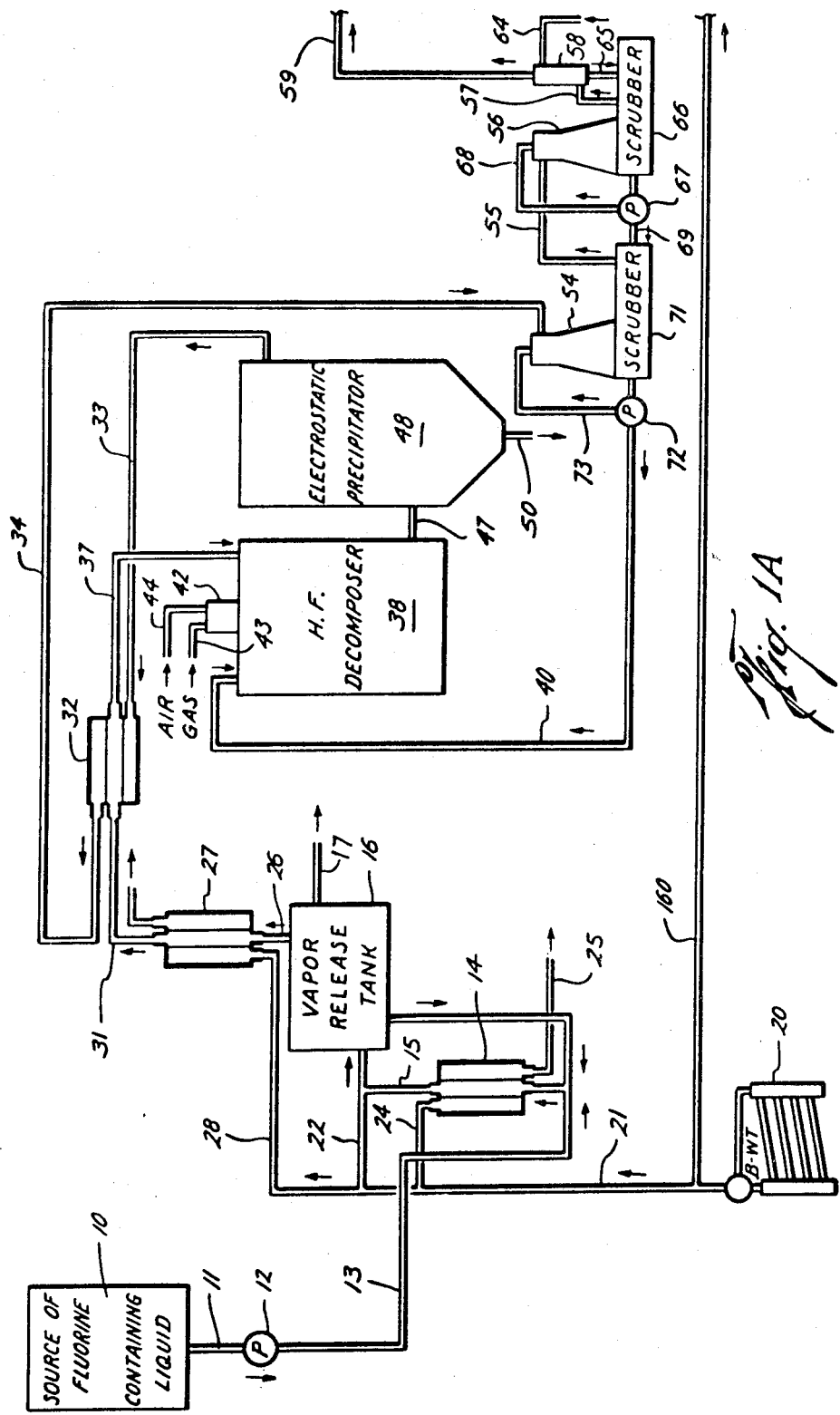

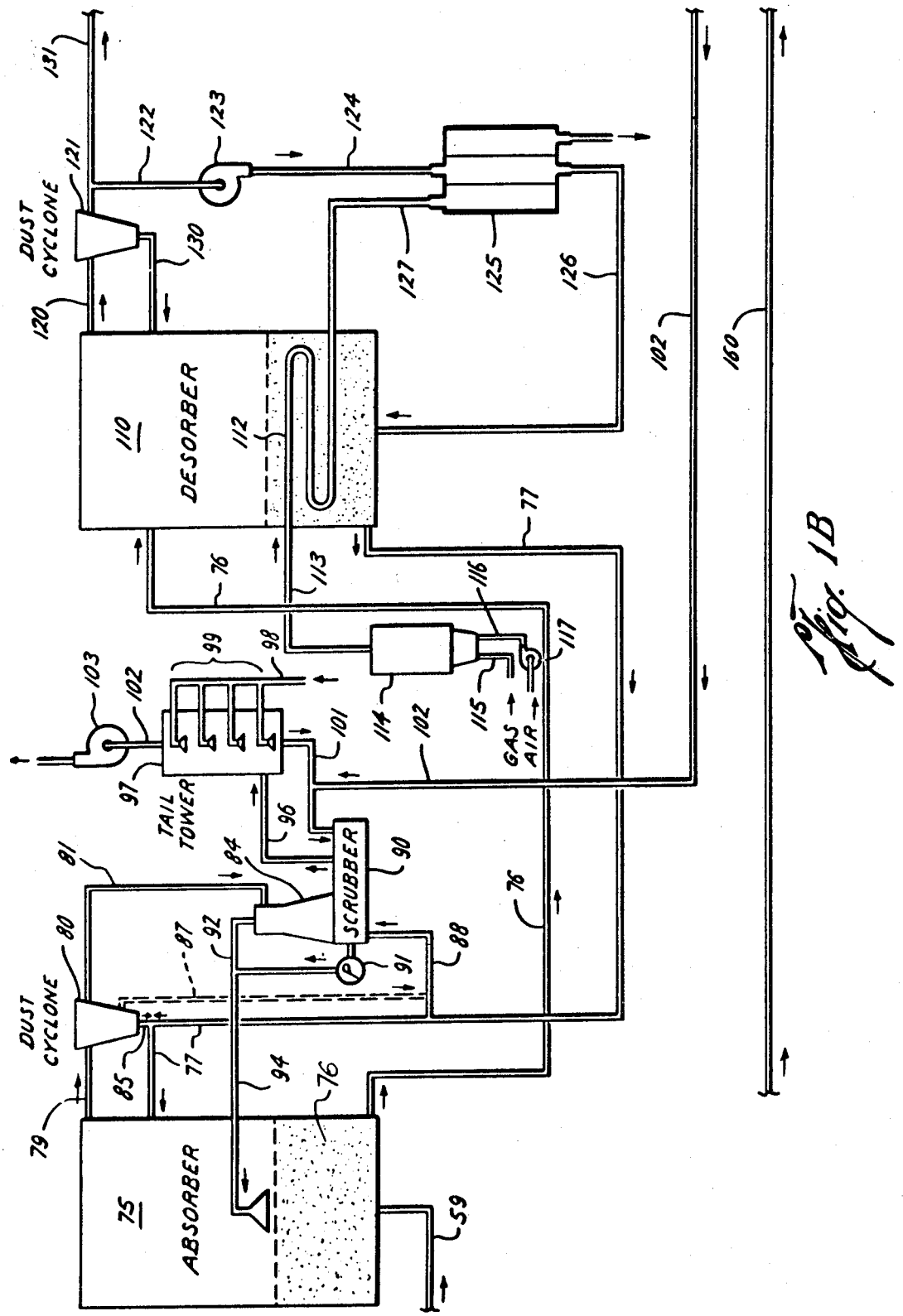

RECOVERY OF HYDROGEN FLUORIDE

This invention pertains to the recovery of hydrogen fluoride (HF) from gas and liquid streams. According to the process herein disclosed, the gas or liquid stream containing fluorine is first subjected to treatments to provide a gas stream containing fluorine in the form of HF. These treatments will vary depending upon the form of the gas or liquid stream to be processed. After all, or substantially all, of the fluorine components have been converted to HF, the HF is removed by absorption in a fluid bed constituted by powdered, granular, or pelletized sodium fluoride (NaF). The sodium fluoride combines with HF and is converted to the bifluoride (NaHF$_2$). HF is recovered by decomposition, or desorption, of the HF from the bifluoride. The sodium fluoride may be recycled for subsequent reuse. The separated HF, in substantially uncontaminated condition, is liquefied by condensation and is a high grade product.

A principal object of the invention is to provide methods for recovery of hydrogen fluoride from gas and liquid streams.

An additional object of the invention is to provide such processes which are economical, dependable, and capable of application to diverse feed compositions.

An additional object of the invention is to provide such processes wherein ordinary inexpensive materials of construction may be used in fabrication of the processing equipment.

Other objects and advantages of the invention will appear from the following description of a preferred embodiment thereof, reference being made to the accompanying drawings, of which:

FIG. 1A, FIG. 1B, and FIG. 1C are sequential portions of a schematic flow diagram illustrating a preferred embodiment of the processes provided according to the invention.

Referring first to FIG. 1A of the drawings, there is shown a source 10 of a water solution of fluosilicic acid (H$_2$SiF$_6$ which may also contain other materials, fluorine-containing or not, in solution or suspension. The solution from source 10 is moved through pipe 11 by pump 12 and through pipe 13 to heat exchanger 14, where the solution is indirectly heated by countercurrent steam. The heated solution passes through pipe 15 to vapor release tank 16.

Steam supplied by boiler 20 is delivered through pipe 21 and pipe 22 to be mixed with the heated solution in pipe 15 before its introduction into the vapor release tank.

Branch pipe 24 supplies steam to heat exchanger 14, the condensate therefrom exiting through pipe 25.

In vapor release tank 16, all materials volatile at the temperature maintained in the vapor release tank are expelled therefrom through pipe 26. Since the source 10 of aqueous fluorine solution is almost invariably obtained from a gas scrubbing unit of a phosphate acidulation plant, the solution will usually contain phosphoric acid (H$_3$PO$_4$). The vapor release tank evaporation of the liquid feed will concentrate the residual materials therein. For example, if the feed from source 10 contains from 1 percent to 1.5 percent P$_2$O$_5$ (as H$_3$PO$_4$ in the solution), then the H$_3$PO$_4$ may be concentrated in the vapor release tank to a concentration of, say, 40 percent to 50 percent P$_2$O$_5$. This concentrated phosphoric acid is delivered from the vapor release tank through pipe 17, and is a valuable by-product material, suitable for use in fertilizer manufacture, in mineral feed supplement manufacture, (since it is substantially defluorinated), or other uses.

Pipe 26 leads to superheater heat exchanger 27. Steam is supplied to the superheater through pipe 28 connecting from pipe 21. In the superheater, the steam indirectly heats the vapors issuing from vapor release tank 16, these materials including silicon tetrafluoride (SiF$_4$), hydrogen fluoride (HF), and water vapor. These materials are delivered from the superheater through pipe 31 to heat exchanger 32, usually at a temperature of about 260°F. In heat exchanger 32, heat is recovered from hot gas delivered through pipe 33 from a process component further along in the system providing gases at a temperature of about 1,250°F. The cooled gases which have been indirectly heat exchanged with the flow through pipe 31 exit through pipe 34 for reintroduction into the process at a later stage.

The heated gases leave heat exchanger 32 through pipe 37 which delivers the gases to decomposer 38. A small amount of fluosilicic acid in solution is delivered to decomposer 38 through pipe 40. The source of this material will be later explained.

Decomposer 38 includes a burner 42 into which natural gas or other fuel is delivered through pipe 43. Air is supplied to the burner through pipe 44 to support combustion of the fuel. In the decomposer, the gas stream entering through pipe 37 and the small amount of liquid feed through pipe 40 are heated in intimate mixed contact in the flame resulting from burner 42. The silicon tetrafluoride (SiF$_4$) and the fluosilicic acid (H$_2$SiF$_6$ are decomposed so that substantially all of the fluorine content is in the form of hydrogen fluoride (HF). This HF gas is delivered from decomposer 38 through pipe 47 to electrostatic precipitator 48. In electrostatic precipitator 48 the hot gaseous materials are passed between oppositely charged electrode elements which causes removal of solid materials from the gas stream. These solids are comprised principally of silicon dioxide (SiO$_2$), which is usually of light density, for example, of about 5–15 pounds per cubic foot. This silica product is a salable by-product of the process.

The silica product exits from the precipitator through pipe 50.

The hot gases from which the solids have been precipitated leave precipitator 48 through pipe 33, previously mentioned, and after passing through heat exchanger 32 are delivered through pipe 34 to scrubber 54. The gases delivered through pipe 34 to the scrubber are usually at a temperature of about 600°F. The gases are composed of the combustion products resulting from decomposer 48, HF, SiF$_4$ and water vapor, the SiF$_4$ gas content being relatively low. From scrubber 54 the gas is passed through pipe 55 to a second scrubber 56. The gases leaving scrubber 56 through pipe 57 pass through clean-up tower 58 and out through pipe 59. Water feed to the clean-up tower and scrubbers is supplied through pipe 64 leading from a suitable water source to clean-up tower 58, then the water flows through pipe 65 to sump 66 of tower 56, this liquid being recycled through tower 56 by pump 67 and recycle line 68. Branch pipe 69 diverts liquid from sump 66 to sump 71 of tower 54. Liquid from sump 71 is recycled through tower 54 by pump 72 through pipe 73. Pipe 40, previously mentioned, conveys liquid recycled to the decomposer 38.

Referring now also to FIG. 1B of the drawings, pipe 59 delivers the scrubbed gases to the lower portion of absorber tower 75. Tower 75 has therein a fluid bed of sodium fluoride (NaF) which is maintained in fluidized condition by the gas stream passing upwardly therethrough. This fluid bed is indicated by reference numeral 76, and consists of sodium fluoride in sub-divided form suitable for fluidization, such as, for example, in powdered, granular, or pelletized form. Instead of NaF in the absorber bed, it is possible to use potassium fluoride (KF), lithium fluoride (LiF) or the rubidium or cesium fluorides, but these materials might cause operating difficulties because of different decomposition characteristics of the bifluorides, and for other reasons. Data on use of these materials as absorbents may be found in *Fluorine Chemistry*, Vol. 1, By Simons, Academic Press, Inc., New York, N.Y., 1950, pages 26–29.

Dust or fines collected in scrubber 84 will grow in size in the recycled scrubber liquor before they are reintroduced to absorber 75 through pipe 94 with the cooling water. In the absorber, substantially all of the hydrogen fluoride contained in the gas stream reacts with sodium fluoride of the fluid bed to convert sodium fluoride to sodium bifluoride.

A portion of the fluid bed material is continuously removed from absorber 75 through pipe 76. Sodium fluoride is continuously fed into absorber 75 through pipe 77. The gases leaving absorber 75 through pipe 79 pass through dust cyclone 80 and then through pipe 81 to scrubber 84. Dust recovered in cyclone 80 is delivered through pipe 85 into pipe 77 to be returned to absorber tower 75. Alternatively, the dust collected in cyclone 80 may be passed through a pipe 87 to pipe 88 leading to sump 90 of tower 84. Pipe 88 delivers sodium fluoride from pipe 77 into sump 90 to be mixed with the scrubbing solution therein. The scrubbing solution in sump 90 is recycled to tower 84 by pump 91 through pipe 92. A portion of the liquid recycle in pipe 92 is diverted through pipe 94 to absorber 75, this liquid, principally water, being evaporated in absorber 75 and hence serving to cool the fluid bed in absorber 75.

Instead of utilizing the heat of evaporation of water added through pipe 94 to cool the bed in absorber 75, the bed may be cooled by cooling coils in the bed or in other suitable manner. The temperature of bed 76 must be maintained at a temperature below the decomposition temperature of $NaHF_2$, and a temperature of about 250°F. has been found to be suitable, although lower or somewhat higher temperatures may be employed.

If more efficient dust recovery is required from the gas leaving absorber 75, an electrostatic precipitator may be used in place of, or following, cyclone 80. The fines may be dissolved, preferably in hot water, and crystallized to form particles of larger size for re-introduction to the system. These alternatives may be applied at the locations of the other dust removal cyclones throughout the system, as well as at this location in the system.

Make-up NaF for the absorber-desorber system may be provided by adding soda ash ($Na_2CO_3$) to the scrubber liquor or to the absorber. The soda ash will react to form NaF in the system. NaF may be added, but soda ash is cheaper.

Scrubbed gas leaving tower 84 through pipe 96 is delivered through the lower end of tail scrubbing tower 97. Water is delivered from a suitable water source to tower 97 through pipe 98 and spray manifold 99. The water collected in the base of tower 97 is delivered through pipe 101 to sump 90 of tower 84. Weak HF solution in pipe 102 is also added to sump 90. Effluent gas from tower 97 exits through pipe 102 impelled by fan or blower 103.

Scrubber 84 and tail tower 97 serve the purpose of cleaning up the gases from absorber 75. The small amount of sodium fluoride added to the scrubbing water in tower 84 is highly reactive to residual HF which might have passed absorber 75 with the gases.

Sodium bifluoride ($NaHF_2$) is moved through pipe 76 to desorber 110. Recovered sodium fluoride (NaF) is delivered from desorber 110 through pipe 77, previously mentioned. Hot combustion gas is delivered to heat exchanger coil 112 within the lower portion of tower 110 through pipe 113 which receives the hot flue gases from combustion box 114 to which gas or other fuel is supplied through pipe 115 and combustion air through pipe 116. A fan 117 is provided to deliver the combustion air to pipe 116 and to the combustion box. The sodium fluoride and sodium bifluoride in desorber 110 are maintained in fluidized condition by a gas stream circulated upward through the desorber through pipe 120, dust cyclone 121, pipe 122, blower or fan 123, pipe 124, indirect heat exchanger 125, and pipe 126. The gas from heat exchanger coil 112 exits through pipe 127 to pass through heat exchanger 125 to indirectly heat the gas stream circulating through the desorber tower 110.

The gas stream circulating upwardly through tower 110 is a hydrogen fluoride gas stream. This hydrogen fluoride gas stream is created by the decomposition of sodium bifluoride to sodium fluoride and hydrogen fluoride in tower 110. The hot gas entering heat exchanger 112 through pipe 113 maintains a temperature of about 700°F in desorber tower 110, this temperature being sufficient to cause decomposition of the sodium bifluoride to the sodium fluoride. Dust carryover from tower 110 collected by cyclone 121 is returned to the tower through pipe 130. While a temperature of about 700°F. in tower 110 has been mentioned as suitable, any temperature above the decomposition temperature of sodium bifluoride may be employed.

Referring now also to FIG. 1C of the drawings, hydrogen fluoride gas is withdrawn from pipe 122 through pipe 131 and delivered to countercurrent indirect gas cooler 133. Cooling water is delivered to cooler 133 through pipe 134 and withdrawn through pipe 135. Condensate created in cooler 133 is delivered through exit pipe 137 to collection tank 138, and then delivered through pipe 140 to pipe 102 carrying the weak hydrogen fluoride recycle stream. This material, which is in very small amounts, is composed primarily of water condensed from the hydrogen fluoride gas stream and has some hydrogen fluoride dissolved therein.

Cooled hydrogen fluoride gas leaving gas cooler 133 is drawn through pipe 142 branching from pipe 137 to packed tower 143. In tower 143, the cooled hydrogen fluoride gas is scrubbed with hydrogen fluoride liquid recycle entering through pipe 145. The hydrogen fluoride liquid recycle or reflux entering tower 143 through pipe 145 is drawn from tower 143 through pipe 146 and delivered to tank 138. The total amount of liquid entering tank 138 through pipes 137, 146 is very small in amount.

The function of the scrubbing operation in packed tower 143 is two-fold. First, any water which may have passed the previous units is absorbed by the downflowing liquid HF. Presence of water in the gas at this point may, for example, occur because of malfunction of the absorption-desorption units. Second, any sodium bifluoride dust passed by cyclone 121 is washed from the gas stream, the bifluoride being at least somewhat soluble in the HF. Therefore, the purity of the HF gas stream is improved by this scrubbing operation.

The scrubbed, cooled hydrogen fluoride gas leaving tower 143 through pipe 149 is delivered to condenser 150. Condensed anhydrous hydrogen fluoride liquid leaves condenser 150 through pipe 152 as product, a small amount of this anhydrous product being delivered through pipe 145 as reflux for tower 143. Cold water is delivered to condenser 150 through pipe 153. The cold water return from condenser 150 passes through pipe 154 to flashpot 155. Cold water from flashpot 155 passes through pipe 156 to refrigerated water storage tank 157. The refrigerated water in tank 157 is withdrawn by the pump 158 through pipe 153. Steam is delivered through pipe 160 branching from steam pipe 21 at boiler 20 to the upper ends of steam-jet pumps or ejectors 162, 163. Water vapor resulting from vacuum evaporation of water in flashpot 155 is delivered by pipe 165 to the jet of steam-jet 162. Cooling water enters ejector 162 through pipe 166 and hot water leaves ejector 162 through pipe 167 extending to sump 168. A pipe 171 extends from ejector 162 to the jet of steam-jet ejector 163. Exhaust steam leaves ejector 163 through pipe 172, also extending to sump 168. Ejectors 162 and 163 form a two-stage ejector system for pulling a relatively high vacuum at flashpot 155. Ejector 163 decreases back pressure on ejector 162 thereby enabling ejector 162 to perform at high vacuum efficiency to cause high evaporation, and high cooling capacity, at flashpot 155.

A small amount of non-condensible gas, including inert gases as well as hydrogen fluoride, is withdrawn from condenser 150 through pipe 174, which delivers the gas to water scrubber 177. Scrubber 177 has sump 178 from which recycled scrubbing liquid is delivered to the top of scrubber 177 by pump 179 through recycle pipe 180. Pipe 182 branches from recycle pipe 180 and delivers weak hydrogen fluoride solution to pipe 102 leading to the sump of scrubber 84. Scrubbed gas leaving scrubber 177 through pipe 184 is delivered to secondary scrubber 185 having sump 186, recycle pump 187 and recycle pipe 188. Scrubbed gas leaving tower 185 is exhausted to the atmosphere through pipe or stack 190. Fresh water is delivered to sump 186 of scrubber 185 through pipe 192. Scrubbing water from sump 186 is delivered to sump 178 through pipe 193.

The following Table I summarizes the operating conditions for an exemplary operation of the process. In the left hand column of the table, various locations in the system are indicated by designation of the equipment element within which the process material is disposed. The compositions, flow rates, and/or other physical characteristics of each process material are indicated in the other columns of the Table.

TABLE I.—EXEMPLARY OPERATING CONDITIONS FOR RECOVERY OF HF, $H_3PO_4$ AND $SiO_2$

| Materials in process equipment elements indicated below | Gallons per minute | Lbs. per minute | Lbs. per hour | Std. cubic feet per minute | Chemical analysis, percent by weight | Temperature, °F. |
|---|---|---|---|---|---|---|
| Source 10 and pipes 11, 13 | 45 | 429 | | | | (1) |
| $H_2SiF_6$ | | 73 | | | 17 | |
| $P_2O_5$ | | 4.6 | | | 1-1.5 | |
| (Feed to vapor release tank 16) | | | | | | |
| Boiler 20 ouptput: Steam (100 p.s.i.) | | | 60,000 | | | |
| Pipe 28, steam | | | 7,600 | | | |
| Pipe 22, steam | | | 11,400 | | | |
| Pipe 24, steam | | | 31,000 | | | |
| Pipe 160, steam | | | 10,000 | | | |
| Pipe X: $H_3PO_4$ product | | 8-14 | | | 2 40-50 | |
| Pipe 31: | | | | | | |
| Gas | | | | 9,200 | | 260 |
| HF | | 13 | | | 3 | |
| $SiF_4$ | | 60 | | | 12 | |
| $H_2O$ (vapor) | | 414 | | | 85 | |
| Pipe 37: | | | | | | |
| Gas (feed to decomposer 38) | | | | 9,200 | | 1,000 |
| HF | | 13 | | | 3 | |
| $SiF_4$ | | 60 | | | 12 | |
| $H_2O$ (vapor) | | 414 | | | 85 | |
| Pipe 43, natural gas | | | | 172 | | |
| Pipe 44, air | | | | 2,000 | | |
| Pipe 47: | | | | | | |
| Gas | | | | 11,870 | | 1,300 |
| Inert gases | | 128 | | | 19.6 | |
| HF | | 60 | | | 9.2 | |
| $SiF_4$ | | 5 | | | 0.8 | |
| $H_2O$ (vapor) | | 428 | | | 65.8 | |
| $SiO_2$ (solid) | | 30 | | | 4.6 | |
| Pipe 40: | | | | | | |
| Water solution | 1.5 | | | | | |
| $H_2SiF_6$ | | | | | 30 | |
| HF | | | | | 5 | |
| Pipe 33, hot gas (from precipitator 48) | | | 11,800 | | | 1,250 |
| Pipe 34, cooled hot gas (from precipitator 48) (feed to scrubber 54) | | | 11,800 | | | 600 |
| Inert gases | | 128 | | | 20.6 | |
| HF | | 60 | | | 9.7 | |
| $SiF_4$ | | 5 | | | .8 | |
| $H_2O$ (vapor) | | 428 | | | 68.9 | |
| Pipe 50, $SiO_2$ product | | 30 | | | | |
| Pipe 64, $H_2O$ | 11 | | | | | |

TABLE I.—Continued

| Materials in process equipment elements indicated below | Gallons per minute | Lbs. per minute | Lbs. per hour | Std. cubic feet per minute | Chemical analysis, percent by weight | Temperature, °F. |
|---|---|---|---|---|---|---|
| Pipe 59: | | | | | | |
| Gas (feed to absorber 75) | | | | 13,800 | | 195 |
| Inert gases | | 128 | | | 18.0 | |
| HF | | 60 | | | 8.5 | |
| H₂O (vapor) | | 521 | | | 73.5 | |
| Pipe 81, gas (feed to scrubber 84) | | | | | | 240 |
| Pipe 77, NaF (feed to absorber 75) | | 126 | | | | |
| Pipe 76, NaHF₂ (feed to desorber 110) | | 186 | | | | |
| (HF) | | 60 | | | | |
| Pipe 94, H₂O (cooling water to absorber 75) | 9 | | | | | |
| Pipe 98, H₂O (to tail tower 97) | 9 | | | | | |
| Pipe 102, gas (exhausted to atmosphere) | | | | 14,000 | | 198 |
| Pipe 113, combustion gas (to coil 112 of desorber 110) | | | 454 | | | 1,800 |
| Pipe 127, combustion gas (from coil 112) | | | 454 | | | 1,000 |
| Combustion gas (leaving heat exchanger) | | | 454 | | | 600 |
| Pipe 126, HF recycle to desorber 110 | | | | 3,400 | | 785 |
| Pipe 131, HF gas (to cooler 133) | | | | 1,140 | | 400 |
| Pipe 142, HF gas (to tower 143) | | | | 1,140 | | 110 |
| Pipes 140, 182, 102, weak HF solution | Very small amounts | | | | | |
| Pipe 149, HF gas (to condensor 150) | | 60 | | 1,140 | | 70 |
| Pipe 152, HF liquid product | | 60 | | | | |
| H₂O | | 0 | | | | |
| Pipe 174, Inert gas | Very small amounts | | | | | |
| Pipe 153, cold water to condenser 150 | | | | | | 40 |

[1] Ambient or above.
[2] As P₂O₅.

Operating efficiency, with careful control, can approach 100 percent, as indicated in Table I. In normal plant operation, hydrogen fluoride recovery efficiency can probably be maintained at 98 percent, or higher. Even with poor control, efficiencies of better than 90 percent hydrogen fluoride recovery can most certainly be maintained.

It will be realized that the method need not be commenced with the fluosilicic acid solution indicated at 10 in the drawing. Instead, a gas stream containing fluosilicic acid, silicon tetrafluoride, HF and/or fluorine in other forms may be introduced, for example, at pipe 37 leading to decomposer 38, which may be the initial elements of the apparatus for performance of the method. In other words, the apparatus indicated at the left hand part of FIG. 1A may not be employed, and the process may commence at decomposer 38. Alternatively, the process may be used commencing at absorber 75 where a gas stream containing HF in vapor form is available for treatment. In each of these cases, the HF is recovered by absorption in the fluid bed 76 and HF recovery at desorber 110. Both of these fluid bed units are of new and novel performance, and the power and raw material requirements thereof are relatively small.

The process as described is economical in use as well as in construction of the facilities for performance of the process. Most of the equipment may be made of ordinary steel because of the temperatures and compositions of the materials as conveyed through the process.

While all necessary valves, pumps, material conveying equipment, and the like, are not shown or described, such are within the capabilities of those of ordinary skill in the art, and may be provided in any suitable forms available in the art to provide efficient material handling characteristics in the process and in the physical plant, to insure smooth, trouble free, efficient operation.

While a preferred embodiment of the process provided by the invention has been shown and described, many modifications thereof may be made by a person skilled in the art without departing from the spirit of the invention, and it is intended to protect by Letters Patent all forms of the invention falling within the scope of the following claims.

I claim:

1. Method for recovering anhydrous liquid hydrogen fluoride (HF) from an aqueous feed liquid containing fluosilicic acid ($H_2SiF_6$) in solution, comprising treating the feed liquid with steam to produce a first gas stream containing hydrogen fluoride, water vapor and silicon tetrafluoride, contacting the first gas stream with a flame to produce a second gas stream containing hydrogen fluoride, water vapor, and solid silicon dioxide ($SiO_2$) in suspension, precipitating the silicon dioxide from the second gas stream, passing the second gas stream upwardly through a first fluid bed containing sub-divided sodium fluoride (NaF) whereby the hydrogen fluoride in the second gas stream reacts with the sodium fluoride in the first fluid bed to produce sub-divided sodium bifluoride ($NaHF_2$) in the first fluid bed, transferring sodium bifluoride from the first fluid bed to a second fluid bed, circulating a stream of hydrogen fluoride vapor upwardly through the second fluid bed while maintaining the second fluid bed at elevated temperature to form sub-divided sodium fluoride in the second fluid bed and to form hydrogen fluoride added to said stream of hydrogen fluoride circulating upwardly through the second fluid bed, transferring sodium fluoride from the second fluid bed to the first fluid bed, withdrawing a stream of hydrogen fluoride from the stream of hydrogen fluoride circulating upwardly through the second fluid bed, and cooling and condensing the withdrawn stream of hydrogen fluoride to produce anhydrous liquid hydrogen fluoride.

2. Method according to claim 1 wherein the anhydrous liquid hydrogen fluoride produced contains at least 95 percent of the fluorine contained in the feed liquid stream.

* * * * *